Oct. 22, 1929.  G. POHLMANN  1,732,658
TRAILER COUPLING FOR SADDLE TRACTORS WITH RUN-UP RAILS
Filed Nov. 2, 1926
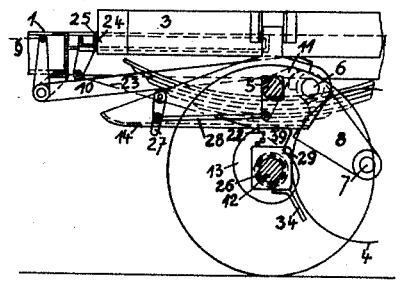
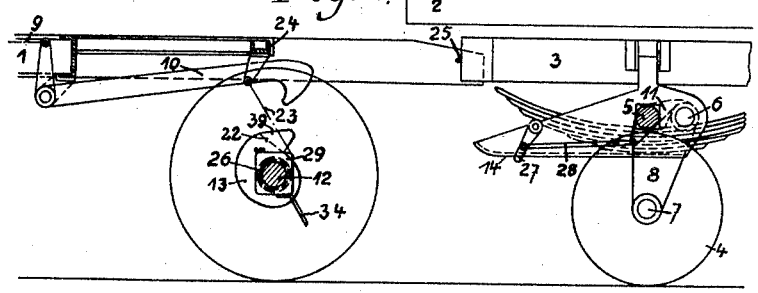
G. Pohlmann
INVENTOR
By: Marks & Clerk
Attys.

Patented Oct. 22, 1929

1,732,658

UNITED STATES PATENT OFFICE

GUSTAV POHLMANN, OF GORLITZ, GERMANY, ASSIGNOR, BY MESNE ASSIGNMENTS, TO THILO KIPPING, OF DRESDEN, GERMANY

TRAILER COUPLING FOR SADDLE TRACTORS WITH RUN-UP RAILS

Application filed November 2, 1926, Serial No. 145,898, and in Germany November 7, 1925.

This invention relates to a trailer coupling for saddle tractors with run-up rails, wherein the trailer in a known manner is mounted with its front part on the rear of the tractor vehicle and its propping wheels lifted off the road surface. The novelty consists in the fact that as the vehicles are pushed together, horizontal run-up rails on the one vehicle cooperate with cam discs or cam rollers on the other vehicle for the purpose of raising the front of the trailer off the ground.

The rotating of the cam discs may be effected by means of a manual drive or by coupling the cam discs to the motor of the tractor vehicle or even automatically by means of suitable devices upon the vehicles being pushed together, in which latter case safety devices are provided which ensure the uniform rolling of the cam discs along the run-up rails.

One constructional form of the invention, by which the rotating of the cam dics is effected automatically, is illustrated in the accompanying drawings, wherein Fig. 1 shows in longitudinal section the rear part of the tractor and the front part of the trailer separated, and Fig. 2 is a longitudinal section of this part of the tractor and the trailer assembled.

1 is the rear part of the tractor vehicle, 2 the front part of the trailer, with the bogie 3 mounted on springs and the propping wheels 4 which are adapted to be swung out by being oscillatable about axles 6 parallel to the supporting axles 5 of the bogie, and the oscillating arms 8 of which carry their axle journals 7.

In the position of use, the oscillatable propping wheels 4 are secured by locking pawls 11, which are releasable either by hand or automatically in a manner to be hereinafter described, upon the vehicles being pushed together and after the raising of the trailer.

Coupling hooks 10 can be raised and sunk by means of pulling devices 9 from the driver's seat. When sunk they pass, due to their inclined face, during the pushing together of the vehicles into their position of engagement, over the carrying axle 5 of the front part of the trailer for coupling the vehicles.

Cam discs 13 are rotatably arranged upon the rear axle 12 of the tractor 1, while with the carrying axle 5 of the trailer bogie, run-up rails 14 are rigidly connected, which upon the pushing together of the vehicles, which in Fig. 1 are shown separated from one another, pass on to the cam discs 13 on the rear axle 12 of the tractor.

The cam discs 13 are rigidly connected with cam plates or pulleys 22 similar to them, upon the peripheries of which are secured pulling members embracing the latter, the other ends of which engage a stop rail 24 which is slidable in the tractor frame in the longitudinal direction of the vehicle and which, upon the vehicles being pushed together for coupling purposes, undergoes its longitudinal displacement from the end of the underframe 25 of the tractor, whereby the pulling members 23 rotate the cam discs 13 against the action of an antagonistic rotating spring 26, by unwinding from the grooved pulleys 22 in proportion to the running up of the run-up rails 14. Hereby the trailer is raised and its propping wheels 4 are lifted off the ground. The latter can now be swung out after the release of the locking pawls 11, by hand, against the action of an antagonistic spring 19, and can be secured by suitable means in the swung-out position. It is preferable, however, to allow the releasing of the locking pawl 11 and the swinging out of the propping wheel 4 to be effected automatically during the assembling of the vehicles. Releasing of the locking pawls 11 for the rocking arms 8 of the propping wheels 4 is effected by a lever 27, which is connected with the pawl 11 by a pull rod 28, and, when the vehicles are pushed together, abuts with its free end against the carrying axle 12 of the tractor or the supporting bearings 29 thereof, as soon as the trailer has been raised for the purpose of removing the propping wheels 4 from the ground.

The swinging out of the rocking arms 8 with the wheels 4 is then effected in the known manner by means of the contact of the wheels 4 with the inclined stop 34 on the rear or carrying axle bearings 29 of the tractor and then contact of the rocking arms 8 with the carrying axle 12 or the bearings 29 thereof, Fig. 2. In this assembled position of the vehicles the coupling hooks 10 have dropped behind the carrying axle 5 of the front frame of the trailer. The trailer is accordingly coupled in a raised position to the tractor. Upon uncoupling, after release of the coupling hooks 10, the tractor is moved away from the trailer, in which case by rotating the cam discs 13 backwards the run-up rails 14 run along again, the releasing lever 27 for the locking pawl is set free and the propping wheels 4 swing back again into their propping position, in which the pawls 11 lock them again.

The cam surfaces of the cam discs 13 pass over at the end of the lift into flat supporting surfaces 39 which present large bearing surfaces to the run-up rails 14, so that the wear of the parts resting upon one another owing to shocks and vibrations is minimized as far as possible.

In the case of coupled vehicles the carrying axles 5 and 12 of the vehicles are preferably arranged perpendicularly one above the other and their vertical central plane intersects the bearing surfaces 39 in the centre, for the purpose of preventing as far as possible subsidiary stresses arising from twisting moments.

Instead of arranging the cam discs 13 rotatably on the rear axle of the tractor and the run-up rails 14 upon the carrying axle 5 of the trailer as shown in the drawing and described above, the cam discs 13 may be rotatably supported on the carrying axle 5 of the trailer and the run-up rails 14 may be supported upon the rear axle 12 of the tractor 1.

What I claim is:—

1. Coupling means for connecting a trailer vehicle to a saddle tractor vehicle, comprising horizontal rails on one of said vehicles, and non-circular cam discs on the other of said vehicles, said rails and cam discs being adapted to co-operate with one another to lift the front part of the trailer vehicle off the ground when the two vehicles are pushed together and the cam discs rotated.

2. Coupling means for connecting a trailer vehicle to a saddle tractor vehicle, comprising horizontal rails supported upon a carrying axle of one of the vehicles, and non-circular cam discs on the other of said vehicles, said rails and cam discs being adapted to co-operate with one another to lift the front part of the trailer vehicle off the ground when the two vehicles are pushed together and the cam discs rotated.

3. Coupling means for connecting a trailer vehicle to a saddle tractor vehicle, comprising horizontal rails on one of said vehicles, and non-circular cam discs secured to an axle of the other of said vehicles, said rails and cam discs being adapted to co-operate with one another to lift the front part of the trailer vehicle off the ground when the two vehicles are pushed together and the cam discs rotated.

4. Coupling means for connecting a trailer vehicle to a saddle tractor vehicle, comprising horizontal rails supported upon a carrying axle of one of the vehicles, and non-circular cam discs secured to an axle of the other of said vehicles, said run-up rails and cam discs being adapted to co-operate with one another to lift the front part of the trailer vehicle off the ground when the two vehicles are pushed together and the cam discs rotated.

5. Coupling means for connecting a trailer vehicle to a saddle tractor vehicle, comprising horizontal rails on one of said vehicles, and non-circular cam discs on the other of said vehicles, said rails and cam discs being adapted to co-operate with one another to lift the front part of the trailer vehicle off the ground when the two vehicles are pushed together and the cam discs rotated, and the lifting surfaces of the cam discs terminating in plane surfaces adapted to support the run-up rails when the coupling is engaged.

6. Coupling means for connecting a trailer vehicle to a saddle tractor vehicle, comprising horizontal rails on one of said vehicles, and non-circular cam discs on the other of said vehicles, and means for rotating said cam discs, said run-up rails and cam discs being adapted to co-operate with one another to lift the front part of the trailer vehicle off the ground when the two vehicles are pushed together and the cam discs rotated.

7. Coupling means for connecting a trailer vehicle to a saddle tractor vehicle, comprising run-up rails on one of said vehicles, cam discs on the other of said vehicles, said run-up rails and cam discs being adapted to co-operate with one another to lift the front part of the trailer vehicle off the ground when the two vehicles are pushed together, and means for preventing said cam discs from slipping on said run-up rails.

8. Coupling means for connecting a trailer vehicle to a saddle tractor vehicle, comprising run-up rails on one of said vehicles, cam discs on the other of said vehicles, said run-up rails and cam discs being adapted to co-operate with one another to lift the front part of the trailer vehicle off the ground when the two vehicles are pushed together, and means for positively rotating said cam discs as they roll along said run-up rails.

9. Coupling means for connecting a trailer vehicle to a saddle tractor vehicle, comprising run-up rails on one of said vehicles, cam discs on the other of said vehicles, said run-up rails and cam discs being adapted to co-operate with one another to lift the front part of the trailer vehicle off the ground when the two vehicles are pushed together, pulleys secured to the cam discs to rotate therewith, tensile members secured at one end to the peripheries of said pulleys, abutments adapted to cause a pull to be exerted on said tensile members as the vehicles are pushed together so as positively to rotate said pulleys and cam discs, and springs tending to rotate the pulleys in such a direction as to wind up the tensile members thereon.

10. Coupling means for connecting a trailer vehicle to a saddle tractor vehicle, comprising run-up rails supported upon a carrying axle of one of the vehicles, cam discs secured to an axle of the other of said vehicles, said run-up rails and cam discs being adapted to co-operate with one another to lift the front part of the trailer vehicle off the ground when the two vehicles are pushed together, the lifting surfaces of the cam discs terminating in plane surfaces adapted to support the run-up rails when the coupling is engaged, means for rotating said cam discs, propping wheels for supporting the front of the trailer when said trailer is not connected to the tractor, oscillatable arms carrying said propping wheels, locking means for securing said oscillatable arms in position, cam fingers associated with the cam discs for releasing said locking means and swinging out the oscillatable arms after the propping wheels have been lifted off the ground, pulleys secured to the cam discs to rotate therewith, tensile members secured at one end to the peripheries of said pulleys, abutments adapted to cause a pull to be exerted on said tensile members as the vehicles are pushed together so as positively to rotate said pulleys and cam discs, and springs tending to rotate the pulleys in such a direction as to wind up the tensile members thereon.

In testimony whereof I have signed my name to this specification.

GUSTAV POHLMANN.